(12) United States Patent
Muto et al.

(10) Patent No.: US 7,110,182 B2
(45) Date of Patent: Sep. 19, 2006

(54) GLASS SHEET INCORPORATING A PLURALITY OF OPTICAL ELEMENTS AND METHOD FOR MANUFACTURING THE SAME

(75) Inventors: Hiroyasu Muto, Saitama (JP); Katsunori Mukasa, Saitama (JP); Masaaki Fukuda, Saitama (JP); Yasuhiko Sato, Saitama (JP)

(73) Assignee: Fujinon Corporation, Saitama (JP)

( * ) Notice: Subject to any disclaimer, the term of this patent is extended or adjusted under 35 U.S.C. 154(b) by 506 days.

(21) Appl. No.: 10/386,221

(22) Filed: Mar. 11, 2003

(65) Prior Publication Data

US 2003/0184872 A1    Oct. 2, 2003

(30) Foreign Application Priority Data

Mar. 26, 2002    (JP)    ............................. 2002-086496

(51) Int. Cl.
*G02B 27/10* (2006.01)
(52) U.S. Cl. .............................. 359/619; 428/72; 65/97
(58) Field of Classification Search ................ 359/619; 428/72; 65/97; 264/1.32
See application file for complete search history.

(56) References Cited

U.S. PATENT DOCUMENTS

| 5,370,768 A | * | 12/1994 | Mersereau et al. ........... 216/26 |
| 6,324,010 B1 | * | 11/2001 | Bowen et al. .............. 359/622 |
| 2003/0107815 A1 | * | 6/2003 | Redmond .................... 359/619 |
| 2005/0113240 A1 | * | 5/2005 | Hayashi et al. ............... 501/50 |

* cited by examiner

*Primary Examiner*—Jordan M. Schwartz
(74) *Attorney, Agent, or Firm*—Jordan and Hamburg LLP

(57) ABSTRACT

To provide a glass sheet incorporating a plurality of optical elements, which incorporates a plurality of glass optical elements and realizes higher productivity and uniform quality of glass optical elements. The glass sheet incorporating a plurality of optical elements includes a plurality of lens parts formed by molding a glass material, reference surface areas each of which is formed around an outer periphery of each lens part and is horizontal to the lens part, and connection parts each of which extends from one reference surface area and connects one lens part to another lens part, in which the connection part has a margin for facilitating separation of the glass sheet into a plurality of pieces.

6 Claims, 4 Drawing Sheets

GLASS SHEET INCORPORATING A PLURALITY OF OPTICAL ELEMENTS AND METHOD FOR MANUFACTURING THE SAME

BACKGROUND OF THE INVENTION

1. Field of the Invention

The present invention relates to a glass sheet incorporating a plurality of glass optical elements intended for improving mass-productivity of glass optical elements used in image sensor chips, such as CCD and CMOS.

2. Description of the Related Art

A conventional glass optical element, for example, a microlens has been manufactured one by one by melting or softening a spherical glass material (glass perform) 100' and press-molding the molten and softened glass material in a mold having a molding surface conforming to an optical surface of a lens which is to be manufactured (see FIG. 1).

For use, a lens 100 thus manufactured has been incorporated into a lens barrel 101 or the like and combined with an image sensor chip 102 as shown in FIG. 2.

However, according to such a conventional method for manufacturing a microlens, the microlenses 100 are manufactured separately one by one. Thus, the productivity is low, and the mass-productivity is also disadvantageously low.

SUMMARY OF THE INVENTION

Thus, an object of the present invention is to provide a glass sheet incorporating a plurality of optical elements, which incorporates a plurality of glass optical elements and realizes higher productivity and uniform quality of glass optical elements.

To attain the above-described object, the present invention provides a glass sheet incorporating a plurality of optical elements comprising a plurality of lens parts formed by molding a glass material, reference surface areas each of which is formed around an outer periphery of each lens part and is horizontal to the lens part, and connection parts each of which extends from one reference surface area and connects one lens part to another lens part, in which the connection part has a margin for facilitating separation of the glass sheet into a plurality of pieces.

Furthermore, a mold comprising a upper die and a lower die is used, and the molten and softened glass material is sandwiched and hot-pressed between the upper die and the lower die, thereby manufacturing the glass sheet incorporating a plurality of optical elements described above.

Furthermore, according to this invention, a plurality of glass optical elements can be manufactured in one molding process, and therefore, the productivity of the glass optical elements is enhanced.

DETAILED DESCRIPTION OF THE PREFERRED EMBODIMENTS

Now, a preferred embodiment of the invention will be described with reference to the drawings.

Figure 1:
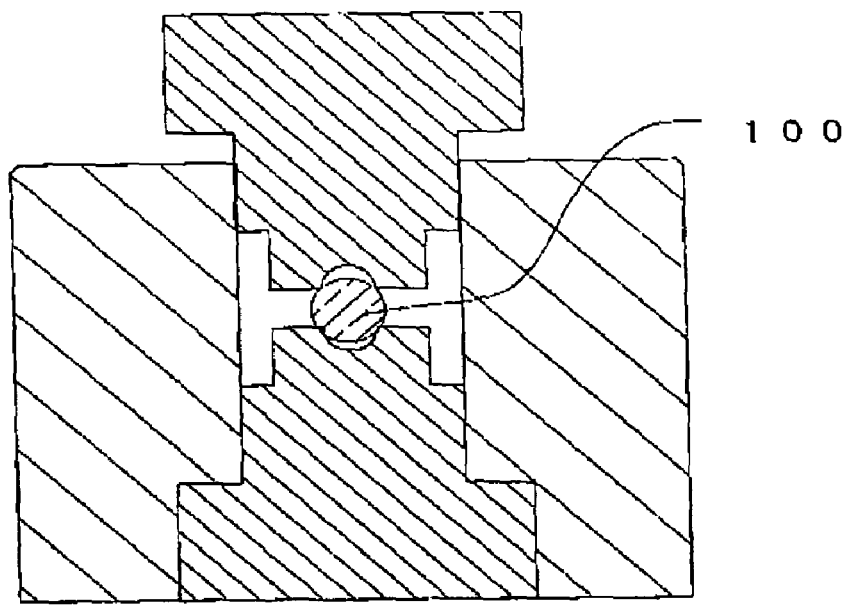
FIG. 1 shows a mold for a microlens according to the related art.
Figure 2:
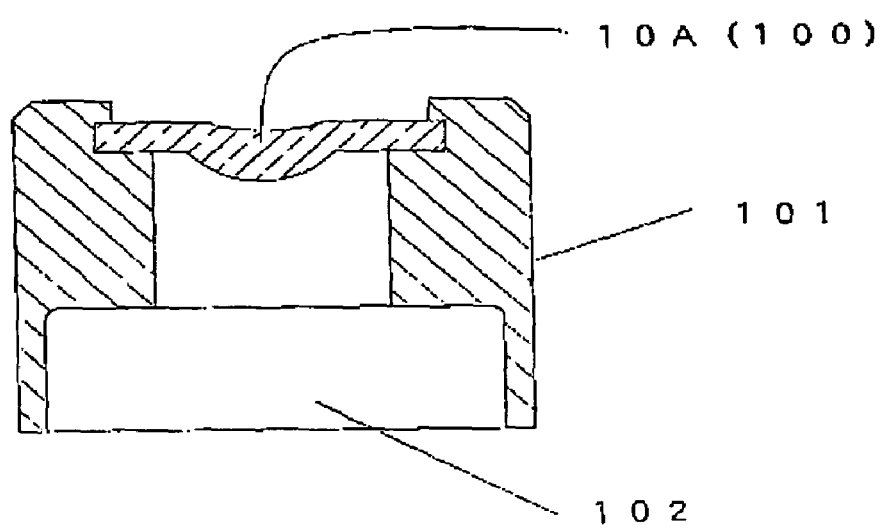
FIG. 2 shows a glass optical element combined with an image sensor chip.
Figure 3:
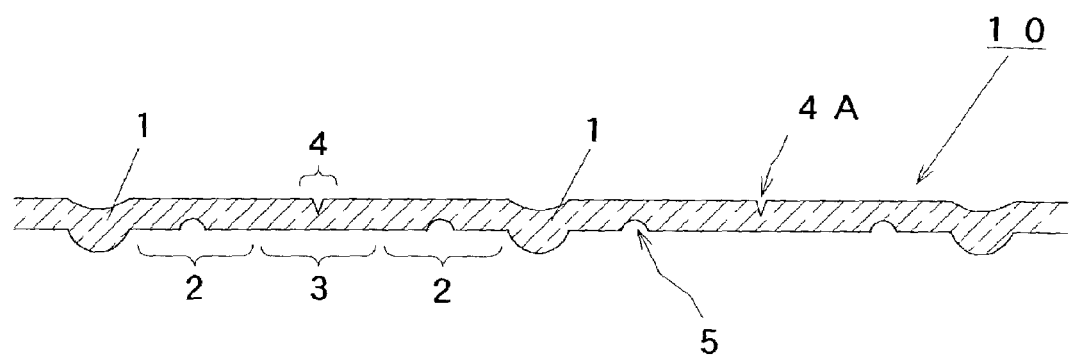
FIG. 3 is a partial cross sectional view of a glass sheet incorporating a plurality of optical elements according to an embodiment of the invention.
Figure 4:
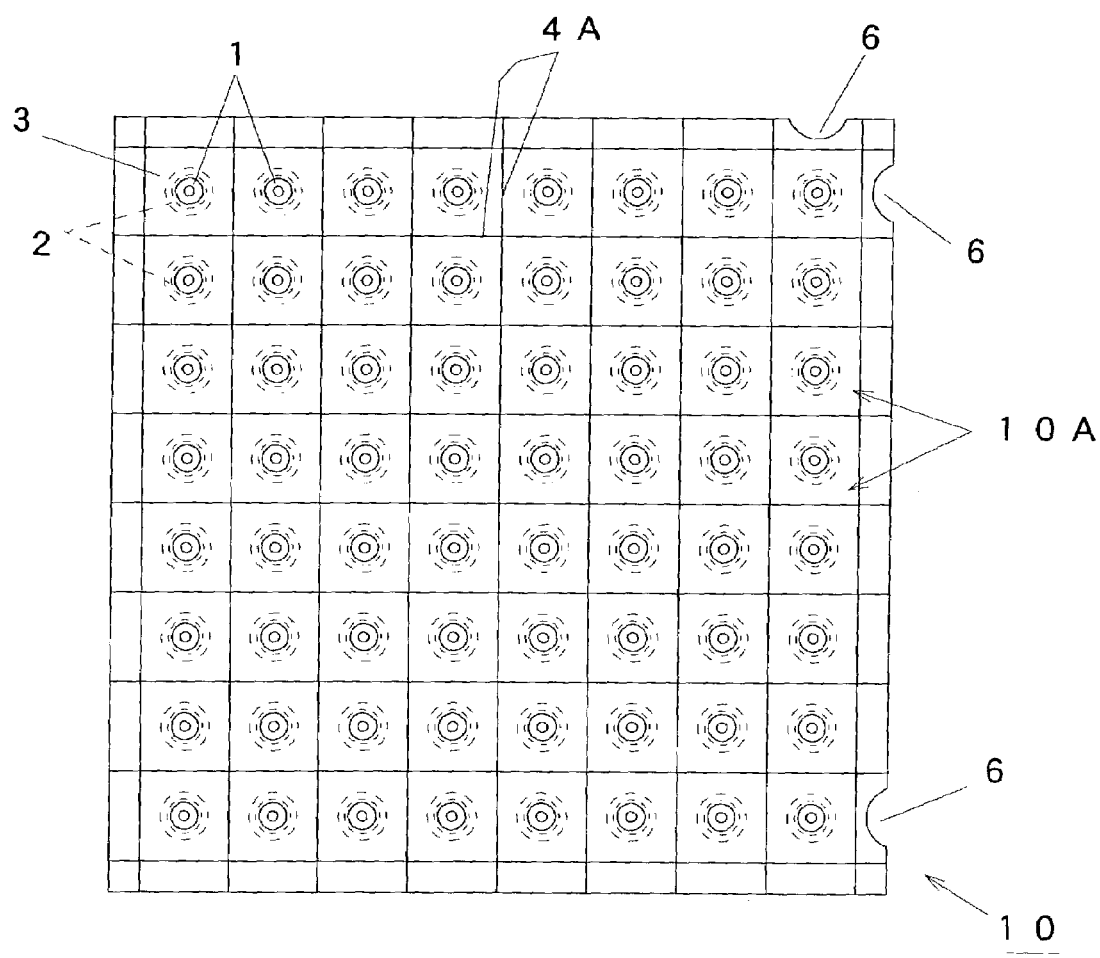
FIG. 4 is a plan view of the glass sheet incorporating a plurality of optical elements according to the embodiment of the invention.

FIGS. 3 and 4 show a glass sheet incorporating a plurality of optical elements according to this embodiment of the invention.

FIG. 3 is a cross sectional view of a part of a glass sheet 10 incorporating a plurality of optical elements. This glass sheet 10 incorporating a plurality of optical elements comprises a plurality of lens parts 1, reference surface areas 2 each of which is formed around an outer periphery of each lens part 1 and is horizontal to the lens part 1, and connection parts 3 each of which extends from one reference surface area 2 and connects one lens part 1 to another lens part 1. The connection part 3 has a margin 4 formed therein to facilitate separation of the glass sheet 10 into a plurality of pieces.

The lens part 1, the reference surface part 2 and the connection part 3 are formed by press-molding a sheet of a glass material. In the embodiment shown in FIG. 3, a cut line 4A is formed on the upper surface of the margin 4 so that the cut line 4A separates the lens parts 1 one by one. However, according to the application, for example, in the case where two, three or more lens parts are used as a unit, the areas where the cut lines 4A are formed may be varied.

The cut line 4A may be formed on the lower surface of the margin 4 or on both the upper and lower surfaces.

The reference surface area 2 is formed in the form of a circle in the lower surface of the outer periphery of the lens part 1, and the reference surface area 2 is horizontal to the lens part 1 and smoothly connected thereto. In the smooth reference surface area 2, a circular and recessed adhesive reservoir 5 surrounding the lens part 1 is formed.

Figure 6:
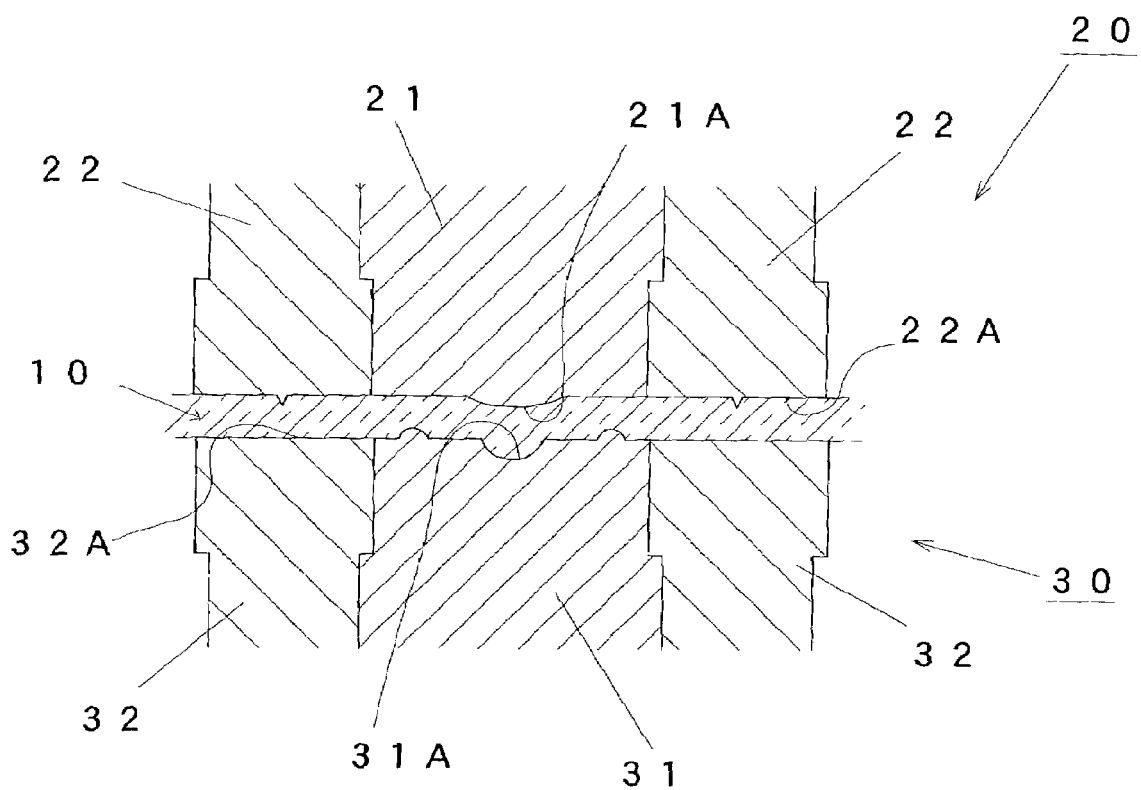
FIG. 6 is a cross sectional view of the glass sheet being press-molded.

The adhesive reservoir 5 is intended to prevent an adhesive from excessively entering to the lens part 1 in the case where the adhesive is applied to the reference surface area 2 to fix the reference surface area 2 and a lens barrel 101 to each other when the glass optical element 10A cut from the glass sheet 10 incorporating a plurality of optical elements is incorporated with the lens barrel 101, and the glass optical element and the lens barrel are combined with an image sensor chip or the like (see FIG. 6).

At least the lens part 1 and the reference surface area 2 are preferably formed by means of a mold with a highly precise transfer surface.

In the case where the glass sheet 10 incorporating a plurality of optical elements is separated into a plurality of pieces, thereby providing the glass optical elements 10A having at least one lens part 1, and the glass optical element 10A is combined with a device, for example, an image sensor chip such as CCD and CMOS, to provide an optical component, the glass optical element 10A which is incorporated with the lens barrel 101 is held at the reference surface area 2, and therefore, the precision of the reference surface area 2 affects the positional precision of the lens part 1, for example, an inclination of optical axis and a focal point.

Therefore, the reference surface area 2 formed around the outer periphery of the lens part 1, as well as the lens part 1 itself, requires high precision.

Thus, the inclination of the optical axis of the lens part 1 with respect to the reference surface area 2 is preferably 0.05 degrees or less. Furthermore, the amount of misalignment between the center of the reference surface area 2 formed in the shape of a circle around the outer periphery of the lens part 1 (or the center of the outer periphery of the lens part 1) and the optical axis of the lens part 1 is preferably equal to or less than 0.02 mm.

FIG. 4 is a plan view of the entire glass sheet 10 incorporating a plurality of optical elements. In this embodiment, a plurality of lens parts 1 is arranged at regular intervals in longitudinal and lateral directions. Around the outer periphery of each of the lens parts 1, the reference surface area 2 is formed. The connection part 3, which is formed around the outer periphery of each reference surface area 2 to connect one lens part to another, has a margin 4 for facilitating separation of the lens part 1 from others, and a cut line 4A is formed in the area of the margin 4. That is, the glass sheet 10 incorporating a plurality of optical elements has 8 rows of glass optical elements 10A, each row having 8 glass optical elements 10A.

A plurality of lens parts 1 formed in the glass sheet 10 incorporating a plurality of optical elements are not necessarily formed at regular intervals. According to the application, for example, in the case where two, three or more lens parts are used as a unit, the lens parts constituting one glass optical element 10A may be arranged closer to each other.

In order to cut, along the cut lines 4A, the glass sheet 10 incorporating a plurality of optical elements into a plurality of glass optical elements 10A, a positioning mark 6 is formed for positioning of the glass sheet 10 incorporating a plurality of optical elements. In the embodiment shown in FIG. 4, two positioning marks 6 are provided on one side of the rectangular glass sheet 10 incorporating a plurality of optical elements, and one positioning mark 6 is provided on one of two sides that intersect with the side.

The three positioning marks 6 allow the lens parts 1 formed in the glass sheet 10 incorporating a plurality of optical elements to be accurately aligned with each other. Thus, when the glass sheet 10 incorporating a plurality of optical elements is placed on a cutter for separation into a plurality of pieces, it can be cut accurately at the area of the margin 4 (along the cut line 4A) without any damage to the lens part 1.

Now, a method for manufacturing a glass sheet incorporating a plurality of optical elements will be described with reference to FIGS. 5 and 6.

In this embodiment, a mold comprising at least a upper die and a lower die is used, and a sheet of molten and softened glass material is hot-pressed by the upper die and the lower die, thereby manufacturing the glass sheet 10 incorporating a plurality of optical elements shown in FIG. 3.

Figure 5:
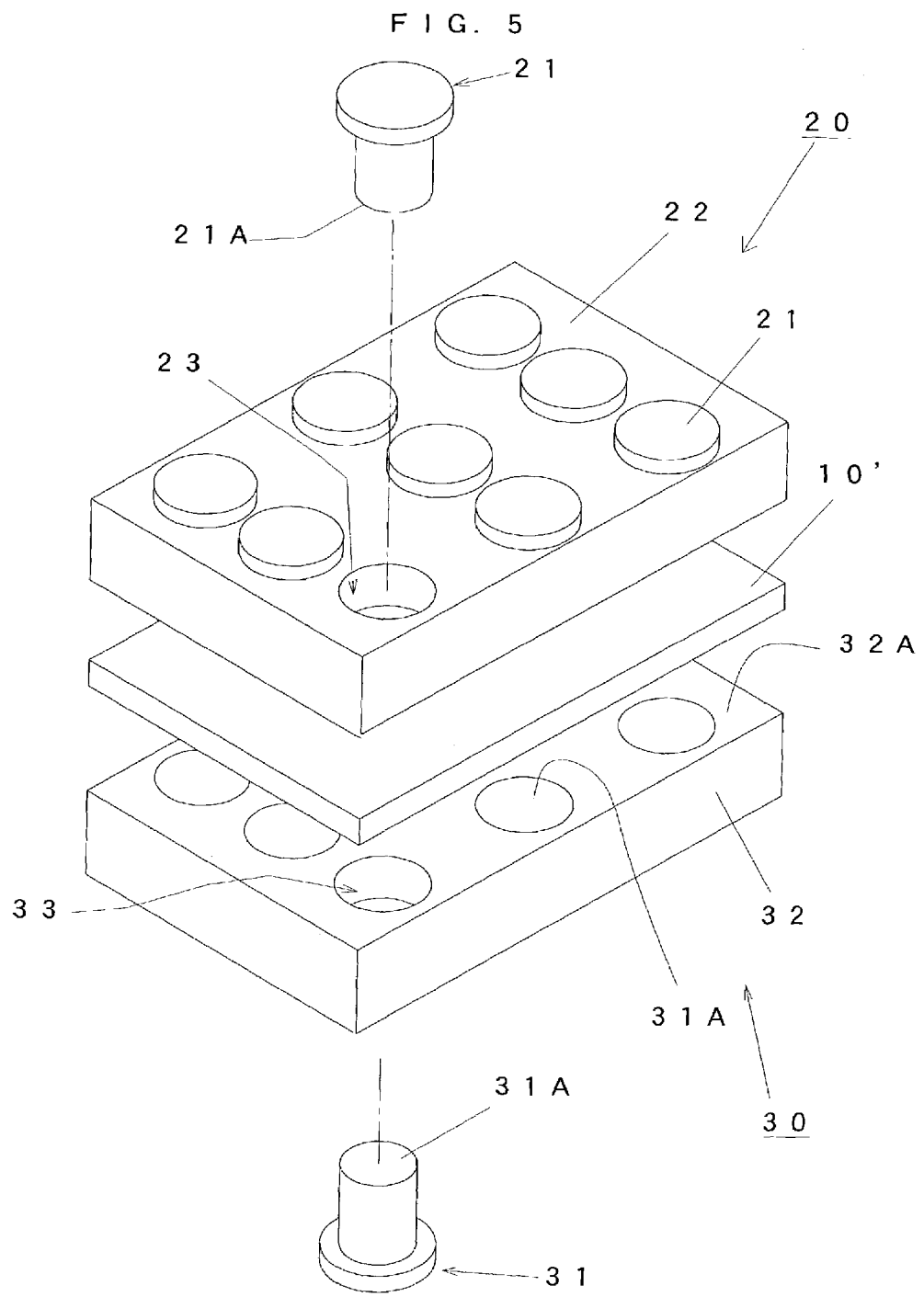
FIG. 5 is a perspective view of an exemplary mold for the glass sheet incorporating a plurality of optical elements.

The mold used in this embodiment is shown in FIG. 5.

In the mold shown in FIG. 5, an upper die unit 20 comprising an upper core 21 having a transfer surface 21A for shaping one of optically functional surfaces (lens surfaces) of the lens part 1 and an upper main body 22 that is to house the upper core and has a transfer surface 22A for shaping the connection part 3 serves as the upper die, and a lower die unit 30 comprising a lower core 31 having a transfer surface 31A for shaping the other of the optically functional surfaces (lens surfaces) of the lens part 1 and the reference surface area 2 and a lower main body 32 that is to house the lower core 31 and has a transfer surface 32A for shaping the connection part 3 serves as the lower die.

The upper main body 22 of the upper die unit 20 has a plurality of mold holes 23, and the upper core 21 is housed in each of the mold holes 23. The lower main body 32 comprising the lower die unit 30 also has a plurality of mold holes 33 formed at locations corresponding to those formed in the upper die unit 20, and the lower core 31 is housed in each of the mold holes 33. In the exemplary mold shown in FIG. 5, the upper main body 22 and lower main body 32 are used which have the mold holes formed at regular intervals.

FIG. 6 is a cross sectional view of the lens part 1 being press-molded. A sheet 10' of a molten and softened glass material is inserted and hot-pressed between the upper core 21 housed in the mold hole 23 of the upper main body 22 and the lower core 31 housed in the mold hole 33 of the lower main body 32, whereby the lens part 1 and the reference surface area 2 are formed on the glass material sheet 10'.

Preferably, the transfer surface 21A of the upper core 21 and the transfer surface 31A of the lower core 31 for shaping the lens part 1 and the reference surface area 2 are provided with a high precision so as to allow the glass sheet 10 incorporating a plurality of optical elements having highly precise lens parts 1 and reference surface areas 2 to be manufactured.

In this embodiment, the transfer surface 31A of the lower core 31 further has a protrusion for forming an adhesive reservoir 5 in the reference surface area 2 formed in the shape of a circle in the lower surface of the outer periphery of the lens part 1.

The connection part 3 is formed by hot-pressing the sheet 10' of the molten and softened glass material between the upper main body 22 and the lower main body 32. In FIG. 6, in order to form a cut line 4A in the margin 4 provided in the connection part 3, the transfer surface 22A of the upper main body 22 has a protrusion for forming a cut line.

That is, the molten and softened glass material 10' is placed between the upper die unit 20 and the lower die unit 30, and then, the glass material 10' is sandwiched and hot-pressed between the upper die unit 20 and the lower die unit 30, thereby forming a sheet material incorporating a plurality of glass optical elements 10A shown in FIG. 3 (glass sheet 10 incorporating a plurality of optical elements). Then, after cooling the sheet, the upper die and the lower die are opened to take out the molded product.

The glass material used may be a glass material composed of $SiO_2$, an alkaline oxide and an alkaline-earth oxide or other various optical glass materials.

What is claimed is:

1. A glass sheet incorporating a plurality of optical elements, comprising:
    a plurality of lens parts formed by molding a glass material;
    reference surface areas each of which is formed around an outer periphery of a respective lens part and is offset from and coplanar with said lens part; and
    connection parts each of which extends from a respective reference surface area and connects one lens part to another lens part, wherein each connection part has a margin for facilitating separation of the glass sheet into a plurality of pieces;
    wherein an adhesive reservoir is formed in each reference surface area to prevent an adhesive for fixing said reference surface area and a lens barrel to each other from entering to the respective lens part.

2. A glass sheet incorporating a plurality of optical elements, comprising:
    a plurality of lens parts formed by molding a glass material;

reference surface areas each of which is formed around an outer periphery of a respective lens part and is offset from and coplanar with said lens part; and connection parts each of which extends from a respective reference surface area and connects one lens part to another lens part, wherein each connection part has a margin for facilitating separation of the glass sheet into a plurality of pieces;

wherein a positioning mark is provided for aligning a plurality of lens parts when the glass sheet incorporating said plurality of lens parts is to be separated into a plurality of pieces.

3. A glass sheet incorporating a plurality of optical elements,
comprising:

a plurality of lens parts formed by molding a glass material;

reference surface areas each of which is formed around an outer periphery of a respective lens part and is offset from and coplanar with said lens part;

connection parts each of which extends from a respective reference surface area and connects one lens part to another lens part, wherein each connection part has a margin for facilitating separation of the glass sheet into a plurality of pieces; and the reference surface area including a circumferentially extending reservoir, the reservoir being radially distanced from the lens part and having a semi-circular cross sectional area.

4. The glass sheet incorporating a plurality of optical elements according to one of claims 1, 2, and 3, wherein an angle of inclination of an optical axis of each lens part with respect to each reference surface area is equal to or less than 0.05 degrees.

5. The glass sheet incorporating a plurality of optical elements according to one of claims 1, 2, and 3, wherein a cut line is formed in the region of said margin.

6. The glass sheet incorporating a plurality of optical elements according to one of claims 1, 2, and 3, wherein the glass sheet is formed by press-molding a sheet of a glass material.

* * * * *